(12) United States Patent
Mora et al.

(10) Patent No.: US 10,878,718 B2
(45) Date of Patent: Dec. 29, 2020

(54) SYSTEM AND METHOD FOR SYNCHRONIZING AUDIO, MOVEMENT, AND PATTERNS

(71) Applicants: Richard Santos Mora, Saratoga, CA (US); Nicholas Clarry Beesley King, Clovis, CA (US); Michael Lewis Costa, San Mateo, CA (US)

(72) Inventors: Richard Santos Mora, Saratoga, CA (US); Nicholas Clarry Beesley King, Clovis, CA (US); Michael Lewis Costa, San Mateo, CA (US)

( * ) Notice: Subject to any disclaimer, the term of this patent is extended or adjusted under 35 U.S.C. 154(b) by 55 days.

(21) Appl. No.: 16/168,570

(22) Filed: Oct. 23, 2018

(65) Prior Publication Data

US 2019/0122577 A1 Apr. 25, 2019

Related U.S. Application Data

(60) Provisional application No. 62/576,525, filed on Oct. 24, 2017.

(51) Int. Cl.
*G09B 19/00* (2006.01)
*G09B 5/00* (2006.01)
*G09B 5/06* (2006.01)

(52) U.S. Cl.
CPC .......... *G09B 19/0015* (2013.01); *G09B 5/00* (2013.01); *G09B 5/06* (2013.01)

(58) Field of Classification Search
CPC ........ G09B 19/0038; G09B 5/06; G09B 5/00; G09B 19/0015; A63B 71/0622; A63B 2244/22
See application file for complete search history.

(56) References Cited

U.S. PATENT DOCUMENTS 8,987,571 B2 3/2015 Ur et al.
2008/0258921 A1* 10/2008 Woo .................... A61B 5/6805
340/540
(Continued)

FOREIGN PATENT DOCUMENTS

GB 2379016 * 2/2003
WO WO-2008129259 A2 * 10/2008 ........... G09B 21/003
(Continued)

OTHER PUBLICATIONS

Björn Schuller, Florian Eyben, and Gerhard Rigoll, Tango orWaltz?: Putting Ballroom Dance Style into Tempo Detection, 2007, EURASIP Journal on Audio, Speech, and Music Processing, vol. 2008, Article ID 846135, Hindawi Publishing CorporationInstitute for Human-Machine Communication, Technische Universität München, Arcisstraße 21, 80333 München, Germany.
(Continued)

*Primary Examiner* — Robert J Utama
(74) *Attorney, Agent, or Firm* — Platinum Intellectual Property LLP

(57) ABSTRACT

A system and method for providing movement indications associated with a first audio information. The system includes an audio input, a storage media, a wearable device, and a processor. The audio input is for receiving the first audio information. The storage media is for storing a plurality of audio informations and a plurality of associated movement patterns. The processor is for matching the first audio information to one of the plurality of audio informations and for returning both a first movement pattern and a first timing information associated with the first audio information. The wearable device has a movement sensor for generating a set of movement measurement that is used for generating a set of movement indications including, at least, a corrective movement indication corresponding to a difference between a movement measurement and the first move- (Continued)

ment pattern. The wearable can also have a movement indicator for transmitting the set of movement indications.

19 Claims, 7 Drawing Sheets

(56) References Cited

U.S. PATENT DOCUMENTS

2010/0015585 A1* 1/2010 Baker ................ A63B 24/0003
434/247
2017/0221379 A1* 8/2017 Onda ........................ G09B 5/06

FOREIGN PATENT DOCUMENTS

WO    WO-2008151642 A1 * 12/2008 ............. A43B 17/00
WO    WO-2017019530 A1 * 2/2017 ........... A63F 13/428

OTHER PUBLICATIONS

Florian Eyben, Bjöorn Schuller, Stephan Reiter, and Gerhard Rigoll, Wearable Assistance for the Ballroom-Dance Hobbyist—Holistic Rhythm Analysis and Dance-Style Classification, 2007, Institute for Human-Machine Communication, Technishe Universität München, Germany.

Henning Pohl, Motion Pattern Recognition for Interactive Dance, Mar. 2010, Masters Thesis, Technishe Universität Darmstadt, Darmstadt Germany.

* cited by examiner

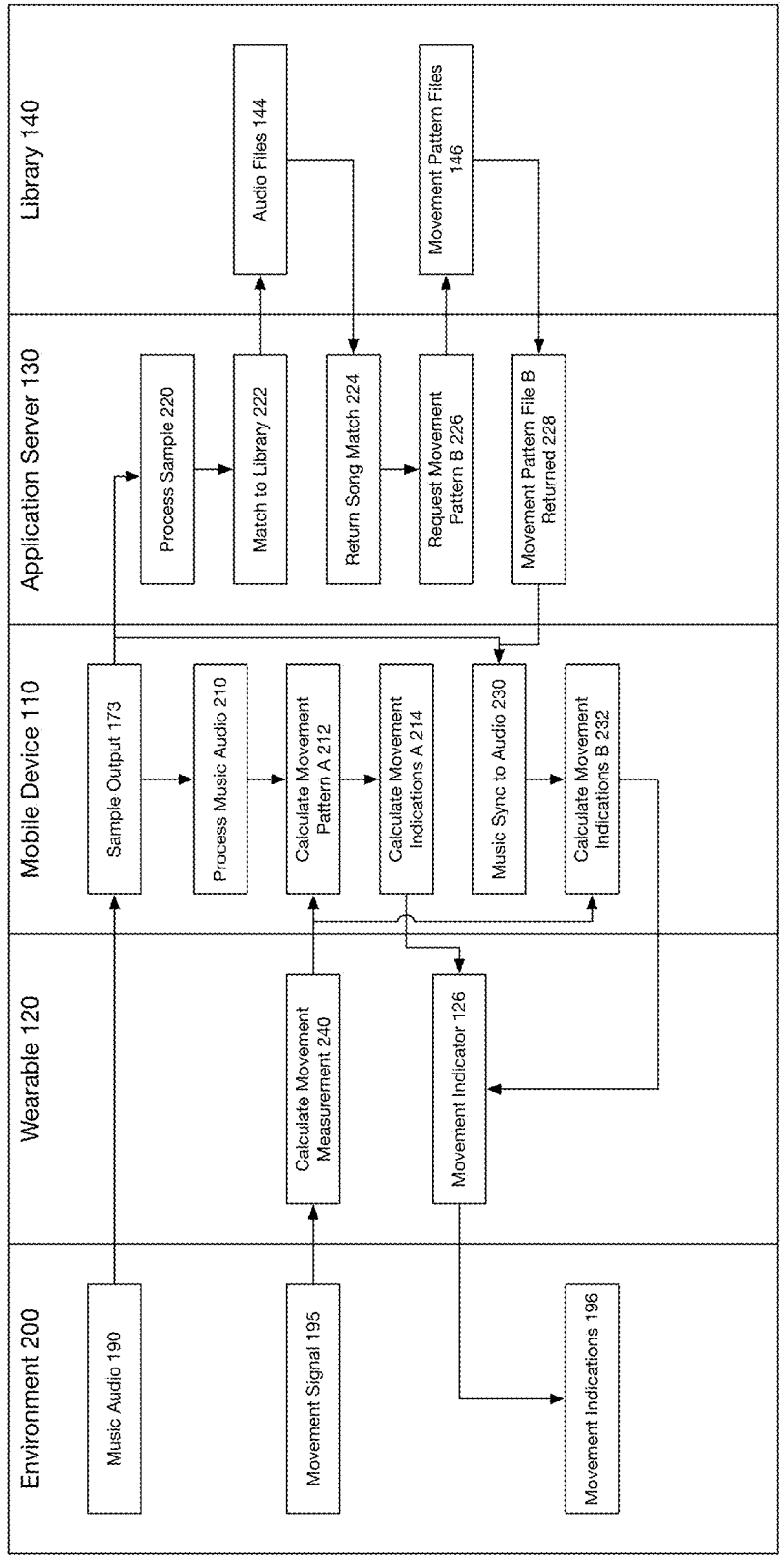

SYSTEM AND METHOD FOR SYNCHRONIZING AUDIO, MOVEMENT, AND PATTERNS

FIELD

This disclosure is generally related to computers for synchronizing audio, movement, and patterns.

BACKGROUND

The synchronization of audio in an environment and live movement using pattern recognition is a complex technical challenge. Even after the proper processing of both the audio and the movement to determine musical patterns and movement patterns, there synchronization hurdles to overcome including latency and processing delays. This is likely the most recent version of video games such as Dance Dance Revolution by Konami (current release 2016 and originally released in 1998) continues to use a "dance pad" which is functional equivalent of a multi-button controller rather than processing movement through image capture or accelerometer based motion sensors. Additionally, the input patterns for these games are predetermined and presynchronized with locally playing audio rather than live processed. Even console systems like the Nintendo Wii that have motion capture and processing capabilities simplify the technical challenges presented by audio and motion synchronization by comparing the motion to audio and video that is exclusively internal to the system. But, the ability to process both audio and movement that are independent of the system allows for distinct advantages, and using pattern recognition to do so allows for multiple variation of movements to match the audio if the underlying patterns match. Solving these technical challenges is particularly useful in teaching people to dance. This is because unknown songs may be played and multiple variations of movements may be on beat. Additional technical challenges beyond processing and synchronization include the limitations of current wearable technology. Wearable devices are generally quite limited in computational power and battery life, further exacerbating the technical challenges for handling live audio and sensor data from movements; especially when providing an output of relevant feedback.

Human physical movement has been linked to music and musical patterns for millennia. This includes recreation such as dancing, as well as practical uses such as military marching. Yet, throughout this time, some have struggled to process audio information to "find the beat", "stay on beat", and have had difficulties with remembering choreography or marches associated with songs. Additionally, some struggle with differentiating between musical patterns due to a hearing impairment or simply not being inclined to process auditory information. Those who lack this natural ability are described colloquially as having a "tin ear." It is very frustrating for one to not be able to participate in social activities simply because they are inclined to visual or kinesthetic processing rather than auditory. This has resulted in a large industry for dance instruction and music lessons, yet these solutions are time consuming and expensive. Additionally, instruction cannot be done without a human instructor, focused and efficient instruction is often one on one as an instructor can only watch one student at a time, and instruction is a separate practice from the actual activity. Therefore, there is an upfront cost to learning before doing rather than learning while doing. This causes many to believe they simply cannot learn to dance or move to a beat.

Thus, a wearable device capable of processing live audio to assist in learning to dance would be quite useful.

BRIEF DESCRIPTION OF THE FIGURES

FIG. 2B is a network process flow diagram in accordance with an embodiment similar to the FIG. 1 embodiment, but with an additional local processing feature.

DETAILED DESCRIPTION

Figure 1:
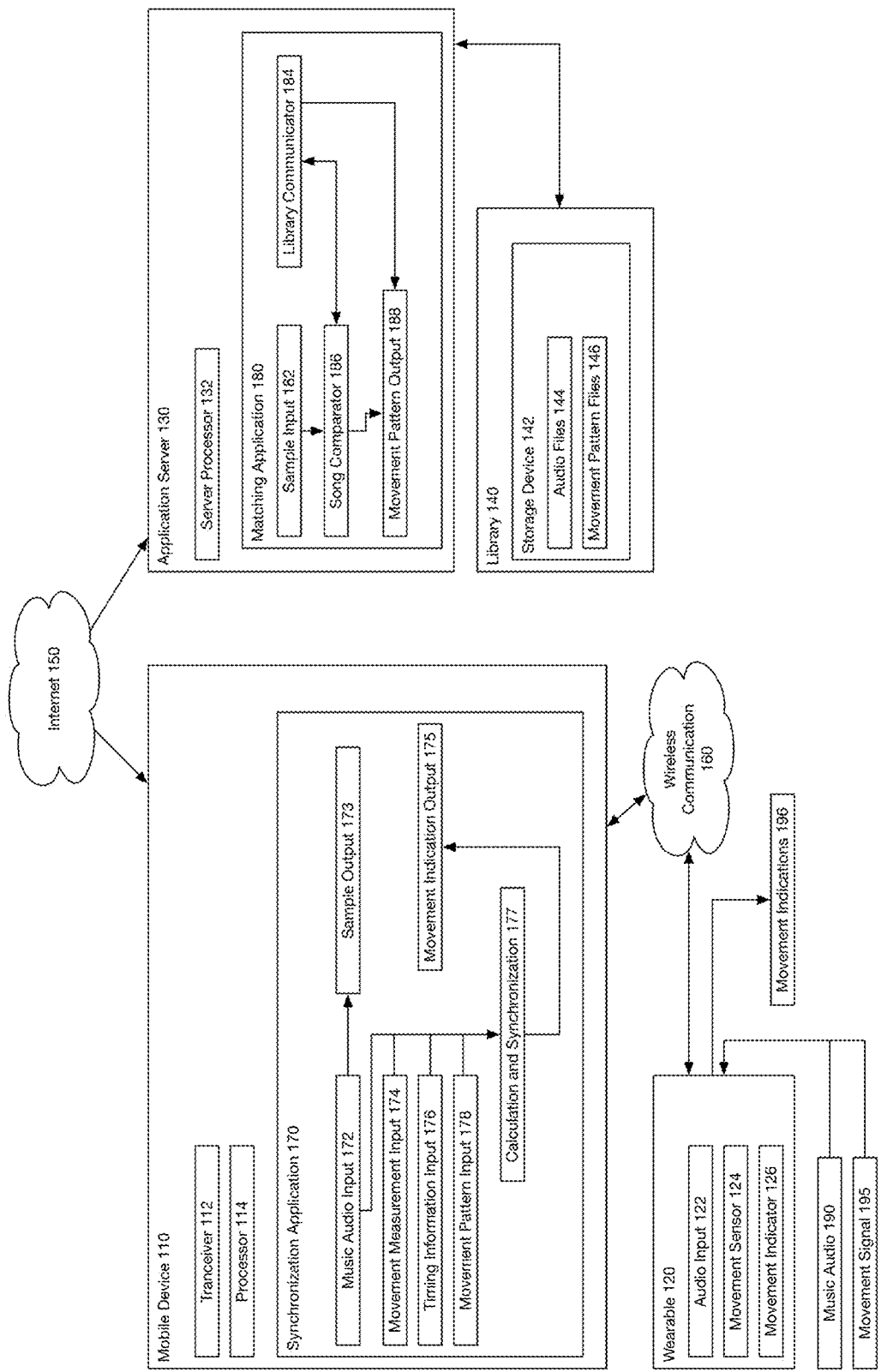
FIG. 1 shows a system level view of one embodiment.

The description is organized as follows. First, terminology that will be used throughout the description are defined. Next, an introduction describing some of the problems addressed by various embodiments will be presented. Then, a high-level description of one embodiment will be discussed. Next, the algorithms used by some embodiments are discussed. Next, more details for implementing the system are discussed. Lastly, additional embodiments are discussed.

The following embodiments will use several terms. They are as follow:

"Application", "program", and "software" all include a set of commands and/or data for execution by one or more computers.

"Beat track" is the underlying beats in the music audio, e.g. the underlying beat of a song as determined by a drum beat or a bass guitar.

"Instruction strength" is the level of intensity on a given movement instruction, e.g. strong vibration or soft vibration when indicating a person should step.

"Mobile device" is an electronic device containing a processor and a storage device that can run applications, e.g. a smartphone. Note that the mobile device and wearable may be encompassed by one physical device (e.g. a smartphone with motion detection, audio input, and that can vibrate). Examples of a mobile device includes the Apple iPhone and the Samsung Galaxy mobile phone.

"Movement indication" is any human discernable feedback that indicates when and/or how a person should move, step, or take any other physical action to perform the associated movement pattern, e.g. a vibration or flashing light or beep on each step of the movement pattern.

"Movement pattern" is a pattern of physical movements a person is to make when participating in an activity such as dancing or marching, e.g. "rock step, left triple-step, right triple-step" for the leader of the dance in east coast swing. A movement pattern can be the movement pattern that is to be performed by that participant for a corresponding music audio.

"Music audio" is any auditory based data, either in raw form, e.g. a song being played live or through speakers external, or as an analog or digital representation of that sound, e.g. a digital music file.

"Musical pattern" is a pattern or structure in the audio information such as the time signature of a song or an overarching and repeating pattern of beats, e.g. the time signature or a waltz is ¾ and the time signature of swing music is 4/4.

"Musical sub-pattern" is specific musical patterns within the larger musical pattern, e.g. the syncopated beats within the 4/4 time signature of swing music.

"Wearable device" is any electronic device that can be worn on the body having both a sensor (such as movement sensors, gyroscopes, accelerometers, bio-metric sensors, microphones) and a feedback device (such as a vibration motor, screen, or speaker) that can communicate with a mobile device or with other devices such as a router, e.g. a smartwatch or clothing with embedded sensors. Note, the wearable device may be comprised of multiple parts that communicate with each other, e.g. pressure sensors embedded in a pair of shoes and vibration motor in a smart watch. Examples wearables include an Apple Watch and a Fitbit Flex fitness tracker.

"Similarity comparison" is a determination of how closely related two movement patterns or musical patterns are, e.g. the comparison between defined choreography and the actual movements of the performer of that choreography. This may be calculated on different sample lengths of patterns, e.g. a full song or the last two measures of the song in real time.

"Similarity score" is an interpretation of numerical result of the similarity comparison, e.g. an A-F grade or 1-10 scaled score.

"Movement measurement" is a representation of the physical movement of a person based on measurements from the sensors of the wearable device, e.g. a pedometer detecting that a step has occurred.

Having defined these terms, we now turn to highlighting the problems addressed. Limitations in computational power, storage capacity, and battery life of wearable devices have created significant obstacles to using a wearable device to process live music audio, identify musical patterns, and to generate and/or match these musical patterns to expected movement patterns. These obstacles are compounded further when adding the additional calculations required to compare movement measurements taken by the wearable device to the expected movement pattern, analyzing the similarity of the movement measurements to the expected movement pattern, and generating a corrective feedback signal of variable intensity, such as vibrating the wearable, based on the similarity score.

While expensive wearables such as the Apple Watch have relatively powerful systems on a chip (SoCs), other lower-cost devices have much more limited onboard processing power. Additionally, the processing power and local storage of a mobile device such as an Apple iPhone vastly exceeds that of most wearable devices. By organizing a system where live music audio are transmitted to a paired mobile device with a significantly more robust processor for initial processing a system can take advantage of increased processor speed with lower impact on battery life. A similar discrepancy in processing power, battery life, and storage exists between mobile devices and cloud based servers with cloud based libraries. Therefore, organizing a system where data is transmitted from the mobile device to an application server such as Amazon Web Services Cloud (AWS) for processing creates additional advantages with respect to processing power and battery life. But, additional technical problems related to timing and synchronization across the devices are generated when using three different systems to generate real-time feedback calculated from live music audio, calculated or stored movement patterns, and live movement measurements.

Timing information can be monitored by using the internal clock of the mobile device as a timing information input to a synchronization application that monitors time-lapses between transmissions, when performing processing operations, and time shifts any signals such that feedback for a person is live and useful. The combination of the synchronization application and offloading the processing load from wearable device to mobile device and from mobile device to application server enables the system to overcome the technical challenges associated with the limitations of wearable devices.

Previous work has been done in the area of providing feedback to dancers that allows for dance style identification from audio files, and work has been done that allows for delivering dance instructions to known music files. But, these solutions have not dealt with the technical challenges associated with processing music from an external source in real time. Additionally, previous systems fail to work in a social dance setting. Some of the challenges are associated with battery life of a wearable when dancing throughout an entire evening. Additionally, the previous work does not allow the system to make adjustments to the intensity of instructions based on measured movement data. Determining when instructions are needed based on the movement of a dancer has not previously been addressed. This feature is necessary in a social dance setting because this allows a dancer to enjoy a song without interruption when they are dancing properly. Additionally, only delivering instructions when necessary also decreases battery usage significant because haptic feedback, such as powering a vibration motor in a wearable, causes significant battery drain.

Additionally, prior systems do not allow for processing music on a remote server and then synchronizing the results with live music. This feature introduces many technical challenges, but again increases both processing power, storage capabilities, while decreasing battery usage thereby vastly increasing the efficiency of the system.

As described in the background, learning to dance by listening to music without supplemental information is difficult. Solving the technical problems associated with wearable device limitations enables a system to perform the necessary functions to create a signal defining a movement pattern to supplement the music, with different human recognizable stimuli, for example, pulsing vibrations, flashing lights or simplified audio such as beeps, indicating when the person should step in real-time. Supplementing the audio with these additional stimuli allows for faster learning and allows those with hearing impairment to participated in audio based activities.

Additionally, wearable biometric sensors such as digital pedometers and fitness trackers can monitor and record the physical movements of a person with movement measurements. By combining and comparing the movement measurements with the processed movement patterns, it is possible to provide real-time personalized dance or movement instructions to individuals or groups and provide reviewable statistics as to the similarity between the actual physical movement and the intended movement pattern for the purposes of scoring accuracy and tracking improvement.

The technical solutions described above enable the functionality of indicating, through human discernable feedback, general or "basic" dance steps associated with musical patterns and songs that contain these musical patterns. The term "basic" can be considered to mean the simplest step pattern of a dance, e.g. slow-slow-quick-quick for foxtrot. Additional functionality enabled include, some embodiments where an output signal can provide instructions relating to a specific choreography by associating specific dance steps, more intricate movement patterns, or variations to basic patterns to specific songs. And finally, some embodiments can generate a similarity score as to how close measured movements are to the movement pattern for which instructions are described in the output signal. This similarity score both dictates the intensity or urgency of the instruction signal given in real time and can be reviewed afterwards to review performance and track improvement.

The technical improvements also enable one embodiment to provide an output signal relating to the movement patterns associated with the Lindy Hop swing dance. Music that is being played over a sound system is received by the audio input of an Apple Watch worn by a dancer. Using an iPhone that is paired with the Apple Watch, a sample of the music is sent via the iPhones cellular data connection to a matching server. The matching server then matches the music to a library of songs, and determines the specific song that is being played. Then a movement pattern file associated with the specific song, which contains the appropriate basic Lindy Hop steps (step, step, triple-step, step, step, triple-step) at the appropriate tempo for the song is returned to the iPhone via the cellular data connection. The movement pattern file is predetermined by as system administrator and added to the library. The iPhone which, receives the movement pattern file and is still receiving the music audio from the Apple Watch, then uses a synchronization application match the timing of the movement pattern file to that known.

The Apple Watch, using the movement sensor in the watch, measures the movement relating to the steps of the dancer and sends this movement signal to the iPhone. The synchronization application compares the actual dance steps performed by the person to the appropriate dance steps determined from the movement pattern file. Then the iPhone calculates movement indications in the form of vibrations using the Apple Watch's vibration motor and sends them back to the Apple Watch. These movement indications provide a human discernable output signal associated with the movement pattern of the Lindy: if the movement measurements are "off beat" (do not occur at the same time as the movement pattern), the indications can increase in intensity to signal the discrepancy between the movement measurements and the movement pattern. If the movements measurements match the movement pattern, the indications can decrease in intensity as no corrective adjustments are needed. This functionality provides a dancer with real-time feedback and allows a person to become a better dancer by adjusting their movement timing and getting them on beat.

FIG. 1 illustrates one embodiment. It is a system having a wearable 120 (such as a smart watch, pendant, device embedded in clothing or shoes, augmented reality glasses, other device) paired with a mobile device 110 (such as a smartphone, tablet, or other mobile computing device) via a wireless communication 160 such as Bluetooth, ZigBee, LR-WPAN (IEEE 802.15.4), or other method. The mobile device 110 communicates with an application server 130 via the internet 150. This internet connection can be achieved using a Wi-Fi network, cellular data connection such as LTE, or another means. The application server 130 communicates with a library 140.

The wearable device receives music audio 190 (such as music being played over a sound system) via an audio input 122 (such as a microphone) of the wearable 120 and transmitting the music audio 190 to the mobile device 110. The wearable receives a movement signal 195 (such as the movements of a person wearing the wearable device), via a movement sensor 124 of the wearable 120 and transmits that movement signal 195 to the mobile device 110. Lastly, the wearable 120 receives a movement indication output 175 from the mobile device 110 and using a movement indicator 126 (such as a vibration motor, LED light or display, speaker, display screen, or other indicator) provides movement indications 196 (such as dance step instructions in the form of vibrations, flashing lights, beeps, or other human discernable feedback).

The mobile device 110 receives the music audio 190 from the wearable 120 and runs the synchronization application 170 on the processor 114 and transmits the inputs and outputs of the synchronization application 170 using the transceiver 112. The transceiver 112 sends the sample output 173 (a sample of the music audio 190) to the application server 130. The processor 114 performs the calculations required by the synchronization application 170 and any other necessary calculations and the transceiver 112 is communicates with the application server 130 via the internet 150 and the wearable 120 via the wireless communication 160.

The application server 130 receives the sample output 173 from the mobile device 110 and uses the server processor 132 to run the matching application 180. Additionally, the application allows the matching application 180 to communicate with the library 140.

The library 140 stores audio files 144 (such as complete songs in lossless or lossy audio file formats, MIDI files containing tracks that make up songs, or other audio based files) on the storage device 142 (such as a network storage device, optical or solid state drive, or cloud based storage system). It also stores movement pattern files 146 (such as files containing information about a pattern of physical movements a person is to make when participating in an activity such as dancing or marching; this can be associated with the basic steps or with a choreography).

The matching application 180 receives the sample input 182 (which is determined by the sample output 173) and uses the song comparator 186 and the library communication 184 (communication between the application server and the library) to match the sample input 182 to a particular audio file 144 thereby identifying the song from which the sample input 182 was taken. The song comparator 186 may use multiple signal processing methods for near matching as is presently done in song identification applications such as Shazam or SoundHound. The matching application also delivers a movement pattern file 146 associated with the matched audio file 144 to the mobile device 110.

The application server 130 and library 140 could be implemented on cloud platforms such as Amazon's AWS, Microsoft's Azure, and/or Google's Compute engine. For example, Amazon's AWS could store the audio files 144 and the movement pattern files 146. Additionally, AWS includes the Redis database which could store the appropriate metadata associated with songs and lookup indices in SQL-tables to associate the movement pattern files 146 with the appropriate songs. Once the matching application 180 returns the metadata for the matched audio file 144, the Redis database can quickly return the associated movement pattern file 146. Additionally, the Redis database can store metadata associated with movement pattern files 146 to allows for functionally described in other embodiments below such as multiple movement pattern files 146 associated with a single audio file and return the appropriate movement pattern file 146 based on an additional parameter.

Figure 2A:
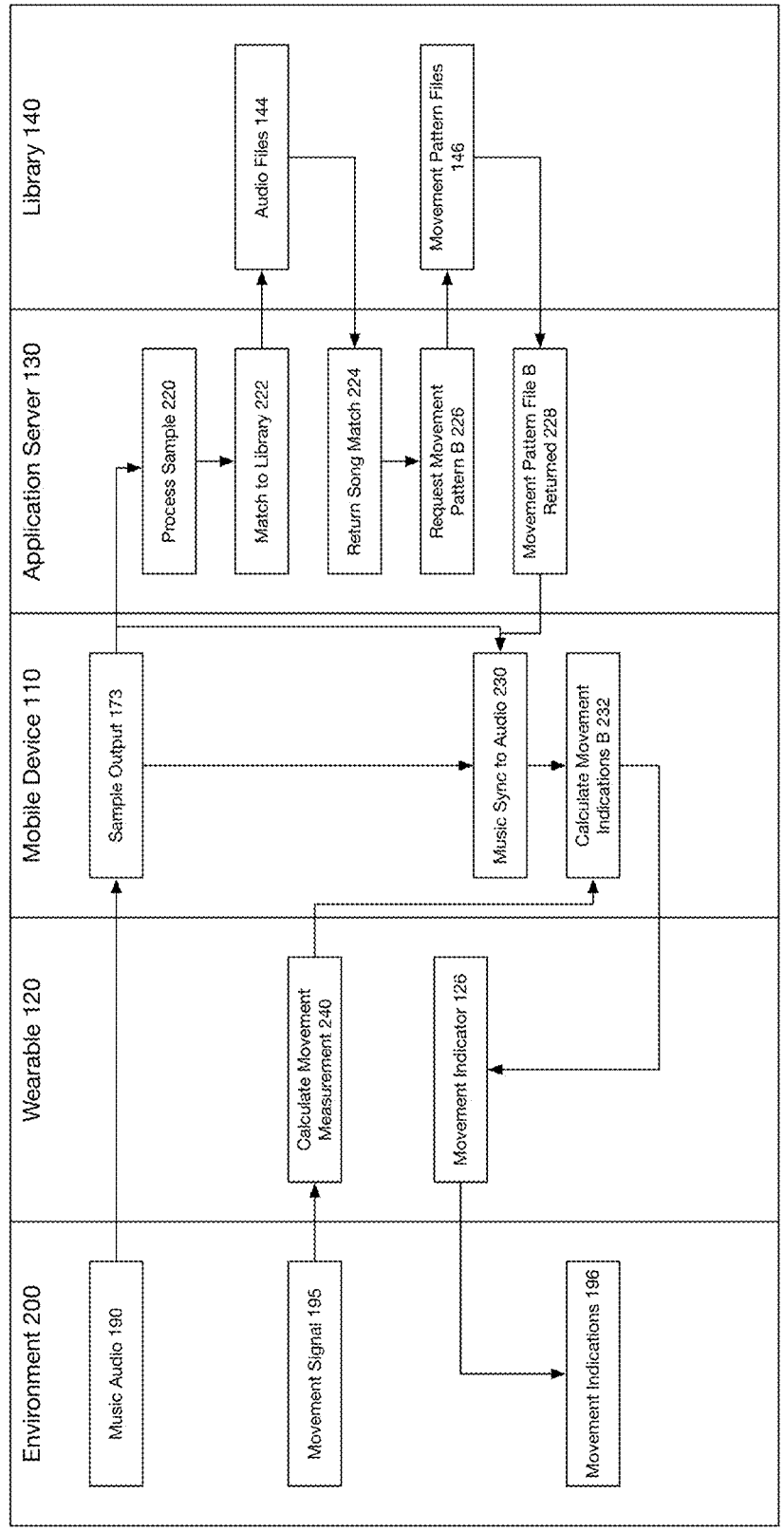
FIG. 2A is a network process flow diagram in accordance with the embodiment in FIG. 1.

The synchronization application 170 generates the sample output 173 from the music audio 190. The synchronization application 170 also synchronizes the movement pattern file 146 received from the application server 130 with the music audio 190, and generates the movement indication output 175 (a signal that allows the movement indicator 126 to generate the movement indications 196). The synchronization application uses the calculation and synchronization 177 to do this. The calculation and synchronization 177 does this by first using music audio 190 delivered through the music audio input 172 in conjunction with timing information input 176 (such as measured time from start of the music audio 190) and the movement pattern input 178 (which is the input of the movement pattern output 188 delivered by the application server 130) to line up features of the music audio with the movement pattern input 178. This can be done by using the timing information input 176 to calculate the general time in the movement pattern input 178 and then adjusting the timing more precisely by determining the beats in the music audio 190 and synchronize these bass beats to the movement measurement input 174 or by using a series of communication delay offsets. Example code for synchronization is shown in the discussion of FIG. 2A. The bass beats can be determined using a low-pass filter or other signal processing methods to process the music audio input 172 to isolate the bassline in the music audio input 172 and then determine individual beats from the amplitude of the baseline. Next, the calculation and synchronization 177 uses the movement measurement input 174 (which is the input determined by the movement sensor 124 in the wearable 120) to perform a similarity comparison based on the timing difference between the movement measurement input 174 and the movement pattern input 178. This timing difference, which can be calculated either as an empirical time difference, or by a mathematical formula analyzing the ratio of the empirical time difference to the time between movements in the movement pattern input 178 is then used to vary the amplitude of the movement pattern input 178 signal to generate the movement indication output 175 (such as a pulse-wave function for a vibration motor in the wearable 120. This intensity adjustment is shown in more detail in FIG. 3.

FIG. 2A illustrates the information processing for one embodiment. Music audio 190 that is being played in the environment 200 (the world outside of the system such as a dance hall holding a dance event) is delivered to the mobile device 110 via the wearable 120 and a sample output 173 is delivered to the application server 130 as described in FIG. 1.

The application server 130 (using the matching application 180 as described in FIG. 1) performs the process sample 220 procedure (receive the sample output 173 and send it to the matching application). Then performs match to library 222 (the procedure of matching the sample output 173 to the audio files 144 using the signal processing described in FIG. 1) thereby requesting the audio files 144 in the library 140. Return song match 224 receives information (such as metadata or the entire song file) from the library 140 thereby letting the application server 130 know what song matches and allows the application server 130 to request movement pattern B 226 (a preprocessed movement pattern file) from the movement pattern files 146 on the library 140. The functionality of the system if no song match is found is described in FIG. 5 below.

A movement pattern file 146 associated with the sample output 173 is found and movement pattern file B returned 228 (the movement pattern file associated with the sample output 173) and is passed through the application server 130 to the mobile device 110 as described in FIG. 1. Then, movement pattern file B returned 228 is used by the sync to music audio 230 process (uses the synchronization application 170 to sync the movement pattern file to the music audio 190 as described in in FIG. 1) and then by calculate movement indications B 232 (uses the calculation and synchronization 177 feature of the synchronization application 170 to generate the movement indication output 175 as described by FIG. 1).

Example pseudocode to generate the calculated movement indications B 232, from movement pattern file B 228 is as follows:

```
Function SyncMovementPattern(liveAudio, movement, sampleOffset,
matchingOffset){
    // movement is in the form ((t_1, a_1), (t_2, a_2), ... )
    // where t_i = time of movement and a_i = intensity of movement
    // sampleOffset is the associated ending time of audio sample used
    // for matching in the identified matching song
    // matchingOffset is the time elapsed from the end of the sample
    // received from the wearable to return of movement pattern file
    // from the application server
    Let OffsetA ← Avg.Comm.delay (wearable to mobile device)
    Let OffsetB ← Avg.Comm.delay (mobile device to wearable)
    Let OffsetTotal
              ← OffsetA + OffsetB + sampleOffset +
                matchingOffset
    Let sncyMovementPattern ← movement starting at
        t = OffsetTotal
    return(snycMovementPattern)
    End
}
Note that additional offsets can be added to the synchronization process in
other embodiments
        Function MovementIndications(syncMovementPattern){
    Let movementIndication ← square wave function where:
        t_i = time of leading edge of pulse
        a_i = amplitude of pulse
        w_i = width of pulse
    Let movementIndication(t_i, a_i, w_i)
                        ← syncMovementPattern(t_i, a_i, (t_{i+1} −
                        t_i)/4)
    return(movementIndications)
    End
}
Note that the amplitude of movement indications sent to the wearable 120
can be further adjusted based on similarity between the movement
signal 195 and the movement indications B 232, this is discussed
further below.
```

Then the wearable 120 performs calculate movement measurement 240 (use the movement sensor 142 to interpret the movement signal 195 and deliver it to the mobile device 110 for the movement measurement input 174 as described in FIG. 1). The mobile device 110 then preforms calculate movement indications B 232 using the same process as described in the synchronization application 170 for adjusting the intensity of the feedback in FIG. 1. The signal generated from calculate movement indications B 232 is then sent to the movement indicator 126 in the wearable 120 which generates the movement indications 196.

FIG. 2B illustrates the network process flow of information in the embodiment described by FIG. 1, but with the additional feature where movement indications 196 for music audio 190 are processed and determined using the wearable 120 and the mobile device 110 locally in real-time until an associated movement pattern file 146 is found using the application server 130 and library 140 as described in FIG. 1.

Music audio 190 that is being played in the environment 200 (the world outside of the system such as a dance hall holding a dance event) is delivered to the mobile device 110 and a sample output 173 is delivered to the application server 130 as described in FIG. 1. Then the mobile device preforms process music audio 210 in which the music audio 190 is run through signal processing functions to calculate movement pattern A 212 (a movement pattern similar to the movement pattern files 146 on the library 140 but using the repetitive patterns of music to predict future movements, this is further described along with sample code in the description of FIG. 4). This process can be continuous to make adjustment as more of the music audio 190 is delivered to the mobile device 110.

Then the wearable 120 performs calculate movement measurement 240 (use the movement sensor 142 to interpret the movement signal 195 and deliver it to the mobile device 110 for the movement measurement input 174 as described in FIG. 1). The mobile device 110 then preforms calculate movement indications A 214 using the same process as described in the synchronization application 170 for adjusting the intensity of the feedback in FIG. 1. The signal generated from calculate movement indications A 214 is then sent to the movement indicator 126 in the wearable 120 which generates the movement indications 196.

Simultaneously to the process music audio 210 system flow path, the application server 130 (using the matching application 180 as described in FIG. 1) performs process sample 220 (receives the sample output 173 and sends it to the matching application) and match to library 222 (the procedure of matching the sample output 173 to the audio files 144 using the signal processing described in FIG. 1) thereby requesting the audio files 144 in the library 140. If a match is found, the library will return song match 224 thereby letting the application server 130 know what song matches and allowing the application server 130 to request movement pattern B 226 (a preprocessed movement pattern file) from the movement pattern files 146 on the library 140.

If a movement pattern file 146 associated with the sample output 173 is found, movement pattern file B returned 228 (the movement pattern file associated with the sample output 173) and is passed through the application server 130 to the mobile device 110 as described in FIG. 1. Then, movement pattern file B returned 228 is used by the sync to music audio 230 process (uses the synchronization application 170 to sync the movement pattern file to the music audio 190 as described in in FIG. 1) and then by calculate movement indications B 232 (uses the calculation and synchronization 177 feature of the synchronization application 170 to generate the movement indication output 175 as described by FIG. 1).

When both movement indications A 214 and movement indications B 232 exist, the mobile device 110 returns only movement indications B 232 to the movement indicator 126 in the wearable 120 which generates the movement indications 196.

The above embodiment allows for the system to process music that is not on the library as well as function during a dance event with live music that may not match any recorded song. Additionally, it allows for the system to function if communication to the application server 130 is interrupted by using the signal generated from calculate movement indications A 214 in these cases. While allowing for continued functionality during communication failure with the application server 130, the general architecture of the embodiment decreases impact on the battery life of the wearable 120 and mobile device 110 by decreasing the processing requirements because process music audio 210, calculate movement pattern A 212, and generate movement indications A 214 as decribed in FIG. 2B become unnecessary if movement pattern file B returned 228 is returned from the application server. Additionally, as communication speeds increase and connections become more reliable, the benefits of offloading the processing to the application server 130 increase. These benefits include the ability to run the system for a longer time before exhausting limited battery life as well as decrease the response time required for song matching by using greater computing power as well as using preprocessed files that may exhaust the local storage capacity of the wearable 120 and mobile device 110.

Figure 3:
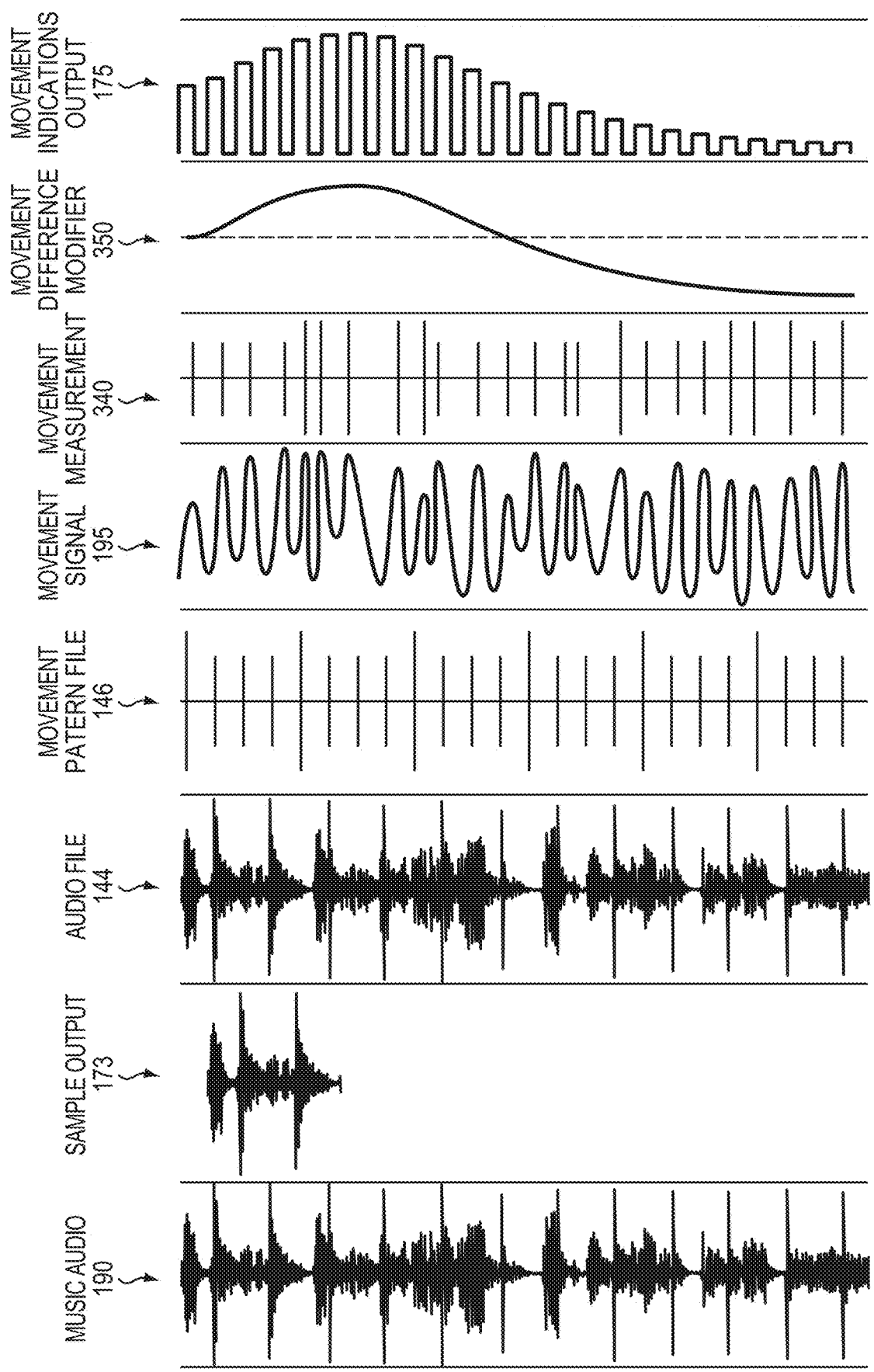
FIG. 3 shows the waveforms generated to support the function of one embodiment including, matching audio music to a movement pattern, comparing a movement pattern with movement measurements, and generating movement instructions.

FIG. 3 is an illustration of the signals and waveforms used in the embodiment described in FIG. 1. The music audio 190 waveform demonstrates a representation of the music audio 190 (such as music being played over a sound system). Sample output 173 is a portion of the music audio 190 (such as a 1 second clip of the song) that is sent to the application server 130 for matching to the audio files 144. The waveform, audio file 144 is the representation of the audio file that matches the sample output 173. In this example, the waveforms for music audio 190 and audio file 144 are extremely similar because they represent the same song. Movement pattern file 146 is the movement pattern (such as the steps to a dance or a step on every beat as seen in this representation) associated with the musical pattern in audio file 144. Movement signal 195 represents the movements of a person as measured by the movement sensor 124 in the wearable 120 (such as the output of the z-axis of an accelerometer as shown in this figure). Each peak in the movement signal 195 represents a step. Movement measurement 340 is a representation of a person's steps (such as a step at the center of every peak in the movement signal 195 above a set step threshold amplitude). Movement difference modifier 350 is a signal determined by the timing difference between the steps indicated in the movement measurement 340 and the movement pattern file 146 (such as a moving average of the time difference between the indicated steps as shown in the figure). The movement difference modifier can be used to modify the movement indications output 175 to vary the intensity of the movement indications 196. For example, the movement indications output 175 can represent a pulse-wave used to control a vibration motor acting as the movement indicator 126 in the wearable 120 and the movement indications output 175 can be generated by first generating a pulse-wave of constant amplitude with pulses centered around the steps represented in the movement pattern file 146 and then modifying the amplitude of the pulse wave by the movement difference modifier 350 as seen in the figure.

Example pseudocode to generate the modified movement indications based on a movement difference modifier is as follows:

```
Function MovementIndicationsMod(movementIndications,
movementMeasurement){
  // movementMeasurement is in the form ((t₁, a₁), (t₂, a₂), . . . ) where:
  // tᵢ = time of step and aᵢ = amplitude of step
  // Calculate the ratio of the timing difference between each measured
  // step and the associated movement indication and the total time
  // between movement indications
  Let timingMod(dᵢ)
```

$$\leftarrow \frac{|\text{movementMeasurement}(t_i) - \text{movementIndications}(t_i)|}{|\text{movementIndications}(t_i) - \text{movementIndications}(t_{i+1})|}$$

Let movementIndicationMod ← square wave function where:

-continued

```
t_i = time of leading edge of pulse
a_i = amplitude of pulse
w_i = width of pulse
Let movementIndicationMod(t_i, w_i) ← movementIndication (t_i, w_i)
Let movementIndicationMod ← square wave function where:
//For first set of steps, do not modify momentIndication amplitudes
for i = (0,7) {
    Let movementIndicationMod(a_i) ← movementIndication (a_i)
}
//Modify amplitude based on moving average of timing difference
for i = (8,15){
    Let movementIndicationMod(a_i)
```

$$\leftarrow movementIndication(a_i) * \frac{\Sigma_{d8}^{di}\,timingMod\,(d_i)}{i-7}$$

```
}
for i > 15 {
    Let movementIndicationMod(a_i)
```

$$\leftarrow movementIndication(a_i) * \frac{\Sigma_{di-7}^{di}\,timingMod\,(d_i)}{8}$$

```
}
return(movementIndicationsMod)
End
}
```

Note that the similarity score based timing differences can be calculated in different manners in other embodiments. Some of these additional embodiments are discussed below.

Figure 4:
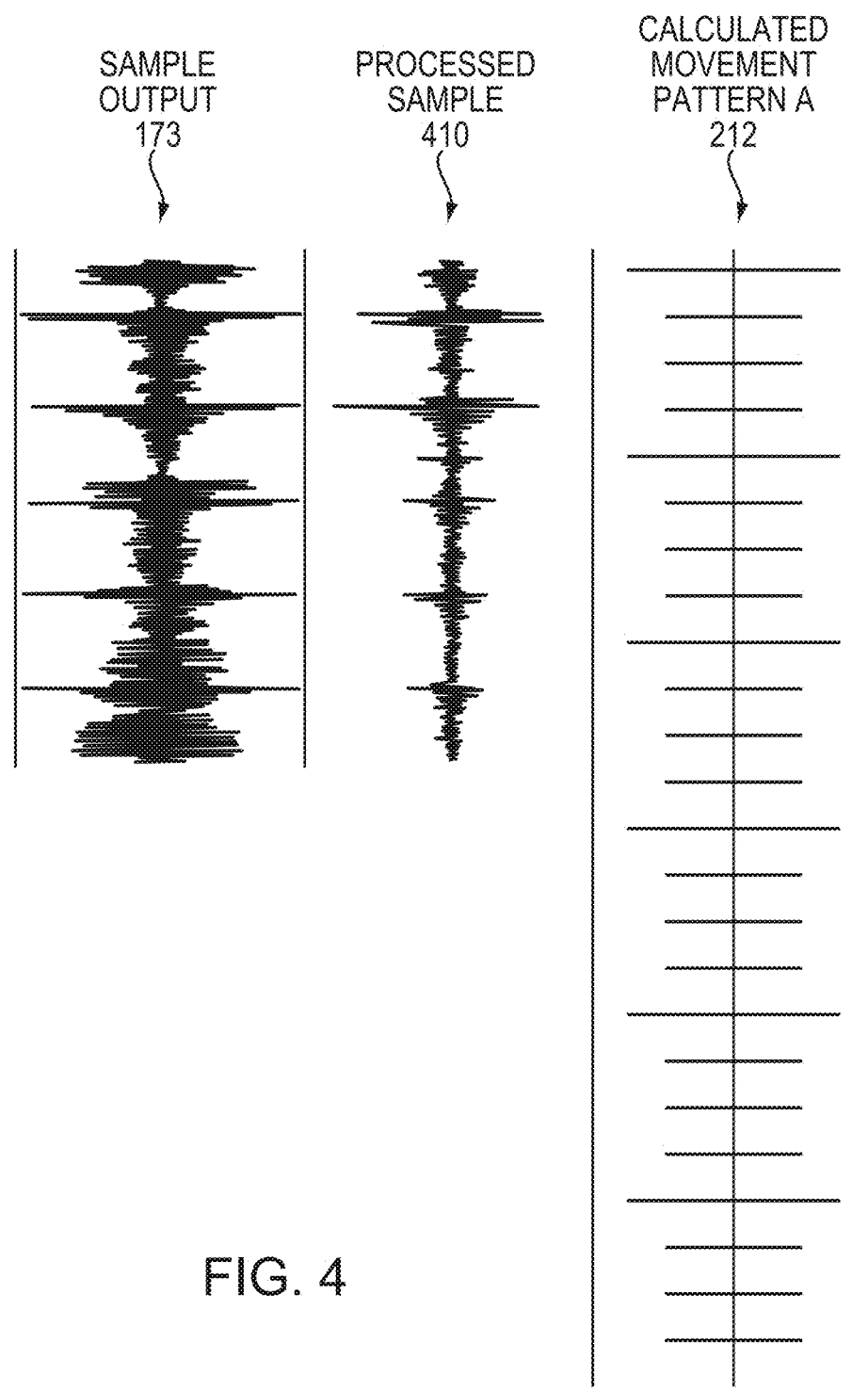
FIG. 4 shows the waveforms created when processing music audio to generate a movement pattern in accordance with one embodiment.

FIG. 4 is an illustration of signal processing that could be performed in order to accomplish the process music audio 210 a calculate movement pattern A 212 functions of FIG. 2B. Sample output 173 is a portion of the music audio 190 (such as a one second clip of the song). Processed sample 410 is the result of signal processing (such as a fast Fourier transform, FFT, to determine the frequencies present in the sample output 173 and then a bandpass filter to isolate the bass frequencies) done on the sample output 173. The calculated movement pattern A 212 can be calculated from the processed sample 410 through further signal processing (such as using an amplitude threshold to determine the timing and pattern of beats in the sample output 173 and then repeating the pattern as seen in the figure; alternatively, movement patterns for specific dance styles can be generated based on the beats determined from the sample output 173).

Example pseudocode to generate the calculated movement pattern A 212, from the sample output 173 is as follows:

```
Function IdentifyBaseFrequencies(audioSignal){
    Let A(t) ← Audio signal in time domain
    Let F(ω) ← FFT[A(t)] // FFT is the Fast Fourier Transform
    Let E(ω) ← |F(ω)|^2 // E(ω) is the energy by frequency
    // The range of 20-20,000 Hertz is the typical human
    audible frequency range
    // Solving for x, enables identification of the low
    frequencies range accounting for 20% of the song
    // energy song which is the low frequency component
    // e.g. x = the upper frequency limit of base track
    Let x ← Solve for x: ∫_20^x E(ω)dω = 0.2 ∫_20^20000 E(ω)dω
    return(x, F(ω))
    End
}
Function IdentifyMovementPattern(frequencySignal, upperFrequency){
    // inputs are both returned from IdentifyBaseFrequencies
    // Bandpass the filter the audio file to the bass notes
    Let F(ω) ← frequencySignal
    Let x ← upperFrequency
    Let F_Bass(ω) ← Trim the domain of F(ω) to 20 ≤ ω ≤ x
    // Convert back to time domain; IFFT is the Inverse FFT
    Let A_Bass(t) ← IFFT[F_Bass(ω)] //audio signal of bass
    // Beats are identified at the leading time edge of amplitude peaks
    Let Movement ← ((t_1, a_1), (t_2, a_2), ... ) where t_i = leading edge time
    when amplitude of A_Bass(t) ≥ 0.9 Max([A_Bass(t)] and
    a_i = Max([A_Bass(t)] for each peak
    return(Movement)
    End
}
```

Note that this method can also to process full songs and store the movement files, or, when processing a sample of a song, the movements calculated can be repeated throughout the duration of the song to create movement pattern A 212. Other code and other threshold values can also be used in other embodiments.

Additionally, the example for calculating movement pattern A 212 above creates a movement pattern associated with one step on each beat. In order to create a movement pattern A 212 associated with a particular dance involves one additional step. Locally stored on the mobile device 110, to be used by the synchronization application 170, are translation formulas from beats to a given style of dance. For example, for the lindy hop, there are 10 steps associates with each set of 8 beats. The steps occur on every beat as well as between beat an additional step between beats 3 and 4, and beats 7 and 8. The additional steps are added to movement pattern file A 212 at the appropriate time by scaling the lindy hop movement translation to the appropriate tempo, and synchronizing it with the beats calculated above.

Figure 5:
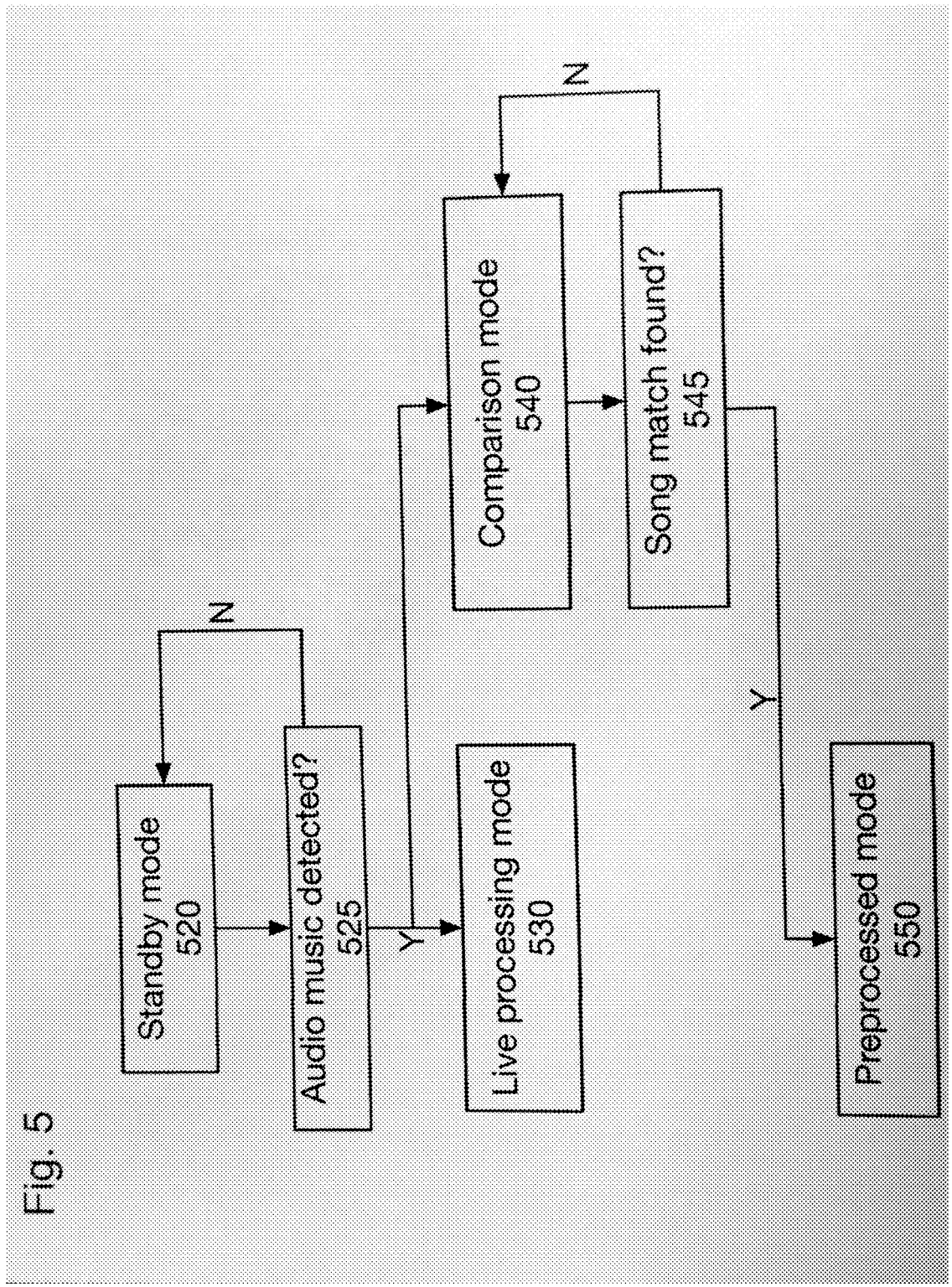
FIG. 5 shows a flow chart of the processing modes in accordance with one embodiment.

FIG. 5 is a flowchart of the modes of operation the system will go through for the embodiment described in FIG. 2A. Standby mode 520 can be when the system is awaiting music audio input and therefore does not deliver any movement indications. Audio music detected 525 is a determination, using signal processing, that noise in the environment 200 is indeed a song and that the system should leave standby mode 520, and simultaneously enter live processing mode 530 (the process by which calculate movement indications A 214 is performed on the mobile device 110 as described in FIG. 2A) and comparison mode 540 (where the system looks for a matching song in the library 140 as described in FIG. 2A). If song match found 545 the system leaves both live processing mode 530 and comparison mode 540 and enters preprocessed mode 550 (the process by which calculate movement indications B 232 is performed as described in FIG. 2B)

Figure 6:
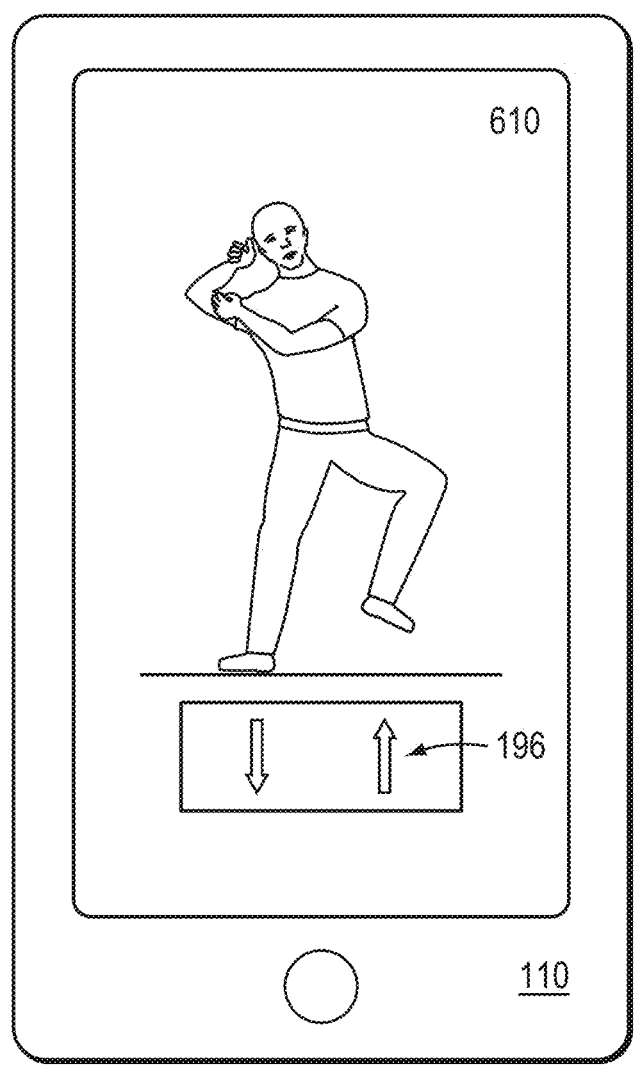
FIG. 6 shows the playback of an audio/video recording of a dancer on a mobile device with movement indications overlaid onto the video in accordance with one embodiment.

FIG. 6 shows another embodiment in which the movement measurement input 174 and the and movement pattern files 146 along with the music audio input 172 and the movement indication output 175 are stored such that human visual feedback can be overlaid onto an audio/video recording of the person dancing 610 after the song has completed. The music audio input 172 or the audio files 144 can be used in conjunction with the recorded audio in the audio/video recording 610 to synchronize the movement indications 196 with the video. This allows a person to repeatedly visually review their own dancing and the associated movement indications 196 in order to understand when they were on or off beat.

Additional Embodiments

There are many additional embodiments including but not limited to the following:

Another embodiment uses an average or moving average of the timing difference between the movement pattern and the movement measurements to determine an overall similarity score for the dancer for the song. This allows a person to compare their progress over time. For example, an extremely fast Lindy Hop song, Jumpin' at the Woodside by Count Basie, is approximately 240 beats per minute. There is a beat every ¼ second. The difference in time between when the dancer steps (movement measurement 340), measured in by the movement sensor 124, and the associate movement in the movement pattern file 146 can be quantized to 0.05 second intervals allowing 5 possible scores for each step before the beat step is missed. This allows for a similarly score of 1-5 for each step, with 1 being approximately 1 full beat ahead or behind the music and a 5 being approximately on beat. The average of the similarity score for each step in a song can be used as a score of the dancer's performance throughout full song. In this example, if the differences in times for 8 steps were [0.03, 0.06, 0.07, 0.11, 0.14, 0.12, 0.08, 0.04] it can be seen that the dancer fell slightly behind the music but then caught back up; their similarity scores for this section of song would be [1, 2, 2, 3, 3, 3, 2, 1] and that would result in an overall score of a 2.1 for this song.

The scoring in this embodiment could be calculated in a relative manner to the speed of the song as shown above with the formula, $$\text{roundup}\left(\text{timing difference} / \frac{60/5}{\text{Beats per minute}}\right).$$

Alternatively, the scoring could be empirical and allow a set timing difference per scoring level.

Another embodiment allows a person to set a skill level which changes sensitivity settings allowing for a greater or lesser timing difference before the intensity of the movement indications are adjusted or the similarity score is changed. A higher skill level setting would require the timing difference to be less to achieve the same similarity score as a person with a lower skill level setting. Additionally, increased intensity in movement indications would occur with lesser timing differences. This allows a person to get more fine-tuned instruction as they improve. An example of this would be decreasing the quantization levels for the similarity score described in the previous embodiment to 0.025 second intervals on a high skill setting but still only have 5 possible scores. In this case, an equivalent empirical difference in timing would result in a lower similarity score.

Another embodiment creates a personal profile to track a person's scores across multiple songs. This allows a person to view their improvement over time and can also break down scores by speed of song and other song features. For example, a user would have a profile and the scores associate with each song would be stored along with date and time information, speed of song, genre of song, and other metadata. When viewing statistical summaries or graphical representations of scores, the scores or summaries could be broken down by each factor or by multiple factors. This allows a person to determine the types songs, (speed, genre, or other factor) to which they get better or worse scores and can help them determine to what songs they should dance. Additionally, this embodiment could make recommendations for songs to which the person would dance well or rank songs as difficult, medium, or easy for the person. A recommendation engine can use the factors and metadata above to weight a given song's recommendation based on average scores received by a person by each of the factors. For example, if the average scores for a beginner dancer were higher for slow songs, but did not vary based on dance style, the recommendation engine would suggest dancing to slow songs. But, if a person was an expert in a particular style of dance, such as tango, their scores would vary minimally by speed of song within the tango category, but greatly by speed in other dance styles. Therefore, the recommendation engine would recommend all tango songs the most, followed by slow songs in other dance styles.

Another embodiment uses a formula such as an average of the average timing difference between the movement pattern and the movement measurements of multiple people to determine a group score for a song. For example, in a group choreography, a similarity score for each step can be generated for each person in the choreography (as described above). The multiple scores for each step can then be averaged to create a group score for each step. Then the group score for each step of the movement pattern can be averaged for the full song to create a group score for a song. This embodiment could apply to scoring couples in a partner dance or to larger group dances. Additionally, this embodiment could allow for different multiple movement patterns for different people in the group thereby scoring a choreography in which different people preform different steps at the same time.

For example, if a group choreography consisting of eight couples, sixteen total dancers, was being performed and the couples are split into two sub-groups there would be four total movement pattern files 146 being danced at the same time: Group A leaders, Group B leaders, and their respective followers A and B. Each dancer would have a profile and their similarity score would be calculated to based on the appropriate movement pattern file 146 for them. But, because the song is the same, a score can be given to each dancer for each beat of the song, which can then be combined into an average group score for each beat. The average scores per beat throughout the song could then be averaged to generate a group score in a similar manner to an individual score as described above. This would allow for empirical rather than subjective scoring of group choreographies in competitions. As it is not possible for a human judge to watch all individual dancers throughout a competition, nor is it possible for a judge to score based on actual time differences from expected movement patterns, this removes much subjectivity from competitions that have been qualitatively judged. These group scores could also work for other competitions such as marching bands, cheerleading, stepping, and other team competitions put to music.

Another embodiment allows for multiple movement pattern files to be associated with a given song. These can be either specific choreographies, or files in multiple styles of dance. For instance, a slow swing dance can be done do the same song as a foxtrot. A person could select the style of dance prior to dancing to allow the system to choose the appropriate movement pattern file for the song. An example of this embodiment would be for a dancer to select the style of foxtrot. If the song Fly me to the Moon by Frank Sinatra was playing, the application server 130 would match the audio file 144 and would find three associated movement pattern files 146. One movement pattern files 146 for lindy hop, one for east coast swing, and one for foxtrot. Metadata associated with the movement pattern files 146 would identify the style of dance and therefore the foxtrot movement pattern files 146 would be returned from the library 140 as requested by the user settings.

Another embodiment allows for an application running on a personal mobile device to process songs stored on that mobile device (such as an iTunes library on an iPhone) or being played by the mobile device via a third-party music application (such as Pandora or Spotify streaming music) rather than a song on a system external to the embodiment. This can be done by delivering the audio file data on the mobile device or being streamed to the mobile device 110 or the audio signal to that is sent to the mobile device's 110 audio output (such as a speaker or headphone jack) to the music audio input 172 instead of using the music audio 190. In this embodiment, it may be possible to use a greater portion or the entirety of the song as the sample output 173 because portions of the song that have yet to play may be accessible because the audio file is stored locally or because portions of streaming music yet to play may be stored in a buffer. Using greater portions of the song as the sample allows for more detailed matching to the audio files 144 in the library 140 and may decrease improper matches in the case of multiple versions of the same song. The longer sample output 173 may allow for more accurate matching by the matching application 180 when the system is operating in comparison mode 540. Additionally, metadata can be used for matching as that is often transmitted through a streaming service or stored locally. Using metadata decreases the processing time and decreases the likelihood of incorrect matches.

Additionally, the longer sample output 173 may allow for the generation of a more detailed calculated movement pattern A 212 when operating in live processing mode. Because a movement pattern A 212 can be created for portions of the song that have yet to play, the generated movement pattern A 212 does not need to be predictive based on repeating beat patterns, but can instead be calculated using the actual beat patterns. This allows for the movement pattern A 212 to account for additional details such as "breaks" (pauses) in the music, or the addition of movements that highlight "hits" (particularly prominent notes or beats) in the music.

Another embodiment allows for wearable 120 to be a wireless earpiece such as a single Bluetooth headphone the for the movement indications 196 to be audio based instructions. In this embodiment, the music audio 190 is matched to the audio files 144 in the library 144 using the same process as described in the first embodiment discussed above. But, the movement pattern file B 228 returned to the mobile device 110 from the movement pattern files 146 on the library 140, is a file containing text with plain language instructions associated with timestamps. Once returned, the sync to music audio 230 process occurs and a text to speech application can be used to calculate movement indications B 232. Alternatively, an audio file with plain language instructions could be returned from directly from the library 140.

Audio instructions can provide more detailed information about the types of movements or upcoming details in the music audio 190 that a dancer may benefit from knowing. For example, advanced warning to a change in the general pattern such as an upcoming "hit" (heavily emphasized beat) or a "break" (pause in the music) may be highlighted by the dancer for styling purposes if they know that it's coming. The audio feedback in this embodiment could also be supplemented with other feedback such as vibrations as described in other embodiments.

Another embodiment allows for the matching application 180 to use metadata of a song stored on the mobile device 110 or being played by their mobile device via a third-party music application (such as Pandora or Spotify streaming music) to identify a matching song in the library 140 rather than using a sample output 173.

Another embodiment allows for machine learning to update the library of movement pattern files and create new movement pattern files 146 for songs on the library without movement pattern files 146 or without movement pattern files 146 associated with a particular style of dance for a given song. If a movement pattern file 146 is not found, the song is processed locally on the mobile device 110 by keeping a sample of the entire song and reprocessing the on a per-beat basis rather than the predictive basis as the song was played. Then the locally processed movement pattern file 146 is uploaded to the application server 130 and stored in the library 140, associated with the matching audio file 144. Multiple occurrences of this from multiple users allows the application server 130 to combine the movement pattern files 146 by average the time and amplitude values for expected steps in the movement pattern files 146 uploaded different users and to ignore outliers based on similarity metrics between each movement pattern file 146 of the same dance type, for the same audio file 144. This allows the system to accurately generate additional movement pattern files 146 to be used by other users.

In another embodiment, the wearable 120 performs the functions of the mobile device 110 and the mobile device 110 and the wireless communication 160 are removed from the embodiment. In this embodiment, the transceiver 112, the processor 114, and the synchronization application 170 are on the wearable 120 and the wearable 120 communicates with the application server 130 via the internet 150.

Another embodiment adjusts the timing of synchronization of the movement pattern file 146 to the music audio 190 depending on if the embodiment is set for the lead or the follow of a partner dance. In a partner dance, the lead indicates steps to the follow with movement. If the lead wants the follow to step at a particular time, the lead must move beforehand giving the follow time to receive the step indication. Therefore, a lead is often slightly ahead of the beat in the music and the follow is slightly behind. This embodiment would time-shift the movement indications 196 for the lead and delay the movement indications 196 for the follow. This embodiment improves the dancing in a partner dance by facilitating communication between the lead and the follow through their respective movements. For example, the leader of a dance should preempt the beat, but the amount by which they should do so varies by the tempo of the song. For a fast song, the time the leader has less empirical time to preempt the beat. But, for a slower there is a maximum time before they are just leading too early. An additional offset to the movement pattern file 146 can be added to the calculation for an application running in "leader mode". This offset would time shift the movement pattern file 146 earlier by approximately the lesser of ⅕ of a beat or 0.1 seconds.

Another embodiment continuously matches sample outputs 173 to the audio files 144 in the library 140 and updates the movement pattern file 146 used to generate movement indications 196 if a new match is found. For example, if a DJ crossfades one song into another without stopping the music, the movement pattern file 146 for the new song replaces the previous song's associated movement pattern file 146 to allow for the correct dance instructions to be given to the dancer. This embodiment also allows the system to recognize if the music stops in the middle of a song and will stop providing movement indications 196.

Another embodiment recognizes if a person stops dancing mid-song and stops providing movement indications 196. If a person stops dancing, then the movement signal 195 generated by their movements would either stop, or change suddenly. The synchronization application 170 recognizes this sudden change through a sudden change in the timing differences between the person's steps and the movement pattern file 146. Additionally, the movement signal 195 could have a sudden decrease in amplitude and/or frequency indicating less movement by the person. If the timing differences were to increase or the movement decrease by a percentage threshold, then the embodiment could determine that the dancer stopped dancing.

Another embodiment uses location information (such as geolocation or relative spatial movement tracking with a multi-axis accelerometer) as part of the movement signal 195 and as part of the movement pattern files 146. This embodiment allows for choreographies and group choreographies that incorporate the spatial position on a dance floor along with the dance steps. As such, a choreographer could add spatial information associated with the exact distances to be traveled and in what direction into the movement pattern file 146 based on the actual dimensions of a performance space. Similarly scoring could then be calculated separately based on spatial position. This would allow individual dancers to practice for a group choreography, including stage movements, in an offsite location.

In another embodiment, the movement pattern files 146 can relate to activities other than dancing. Exercise routines for activities such as aerobics or kickboxing can be put to music and associated movement pattern files 146 can be generated and associated with audio files 144. Movement pattern files can also be created for interval training or to help a runner maintain a running pace. This embodiment could also be used to assist in the learning of cheerleading or gymnastic routines.

What is claimed is:

1. A system for providing movement indications associated with a first audio information, the first audio information corresponding to a first musical piece, the system comprising:
   a wearable device having a movement sensor, and a movement indicator;
   an audio input for receiving the first audio information;
   a storage media including a plurality of audio informations and a plurality of associated movement patterns;
   a processor for using the first audio information to identify one of the plurality of audio informations and for returning a first timing information and a first movement pattern, wherein the first timing information and the first movement pattern are associated with the first musical piece; and
   wherein the movement sensor is for generating a set of movement measurements, and wherein the wearable device is further for using the first movement pattern and the movement measurements to generate a set of movement indications, wherein the set of movement indications includes at least a corrective movement indication corresponding to a difference between a movement measurement and the first movement pattern, and wherein the movement indicator is for transmitting the set of movement indications.

2. The system of claim 1 wherein the corrective movement indication corresponds to a timing difference between the movement measurement and the first movement pattern.

3. The system of claim 2 wherein a corrective movement indication has an instruction strength, and the instruction strength of the corrective movement indication varies as the timing difference varies.

4. The system of claim 2 wherein the corrective movement indication corresponds to a skill level setting and wherein a higher skill level setting decreases a predetermined timing difference to generate a corrective movement indication.

5. The system of claim 1 wherein the wearable device communicates wirelessly with a mobile device running an application for controlling the wearable device; and
   wherein the mobile device communicates wirelessly with an application server running a matching application for communicating with, a library for storing multiple musical pieces, to match the first audio information to the first musical piece.

6. The system of claim 1 wherein a movement indication has an instruction strength, and a subset of movement indications corresponding with the first indication of a repeating sub-movement pattern within the first movement pattern, in the set of movement indications includes a movement indication variation for increasing the instruction strength of a movement indication.

7. A system for providing movement indications associated with a first audio information, the first audio information corresponding to a first musical piece, the system comprising:
   a wearable device having a movement sensor, and a movement indicator;
   an audio input for receiving the first audio information;
   a processor for determining a repeating musical pattern within the first musical piece depending on the first audio information and for determining a movement pattern depending on the repeating musical pattern; and
   wherein the movement pattern is a pattern of physical movements, and wherein the movement sensor is for generating a set of movement measurements, and wherein the wearable device is further for using the movement pattern and the movement measurements to generate a set of movement indications, wherein the set of movement indications includes at least a corrective movement indication corresponding to a difference between a first movement measurement of the set of movement measurements and a first physical movement of the pattern of physical movements, and wherein the movement indicator is for transmitting the set of movement indications.

8. The system of claim 7 wherein the repeating musical pattern is a first repeating musical pattern, and a second repeating musical pattern is determined using a second audio information; the first and the second repeating musical patterns are for comparison to the first musical piece for generating a first and second pattern similarity score, and the second repeating musical pattern is further for replacing the first repeating musical pattern for use in the generation of the movement pattern if the second pattern similarity score is greater the first pattern similarity score.

9. The system of claim 8 where the first and second repeating musical patterns are used to create a second movement pattern; and where the second movement pattern is stored on a storage medium for use with the first musical piece.

10. The system of claim 7 wherein the wearable device includes the audio input and the processor.

11. The system of claim 7 wherein the system is operated on a combination of a wearable device and a mobile device and wherein the wearable device and the mobile device communicate wirelessly.

12. The system of claim 7 wherein the transmitting the set of movement indications is stopped in response to a change in the first audio information.

13. The system of claim 7 wherein the set movement measurements include geolocation information.

14. A method for providing movement indications associated with a first audio information, the first audio information corresponding to a first musical piece, the method comprising:

receiving a first audio information from an audio input and receiving a movement signal;

using the first audio information to identify a first musical piece within a set of musical pieces and to a corresponding first movement pattern; and for using the first movement pattern and the movement measurements to generate a set of movement indications, wherein the set of movement indications includes at least a corrective movement indication corresponding to a difference between a movement measurement and the first movement pattern, and wherein the movement indicator is for transmitting the set of movement indications.

15. The method of claim 14 wherein the method further provides a score determined by the set of timing differences between the movement measurements and the first movement pattern.

16. The method of claim 15 wherein the multiple scores are generated from multiple sets movement measurements.

17. The method of claim 16 wherein a group score is generated from the multiple scores.

18. The method of claim 15 wherein the multiple scores are generated from at least a first movement pattern and a second movement pattern.

19. The method of claim 14 wherein the transmitting the set of movement indications is stopped in response to a change in the movement signal.

\* \* \* \* \*